United States Patent
Kuske et al.

(10) Patent No.: US 10,519,901 B2
(45) Date of Patent: *Dec. 31, 2019

(54) LOW-PRESSURE EGR VALVE HAVING A CONDENSATE LINE

(71) Applicant: Ford Global Technologies, LLC, Dearborn, MI (US)

(72) Inventors: Andreas Kuske, Geulle (NL); Franz Arnd Sommerhoff, Aachen (DE); Joerg Kemmerling, Monschau (DE); Hanno Friederichs, Aachen (DE); Vanco Smiljanovski, Bedburg (DE); Helmut Matthias Kindl, Aachen (DE); Daniel Roettger, Eynatten (BE); Christian Winge Vigild, Aldenhoven (DE)

(73) Assignee: Ford Global Technologies, LLC, Dearborn, MI (US)

(*) Notice: Subject to any disclaimer, the term of this patent is extended or adjusted under 35 U.S.C. 154(b) by 205 days.

This patent is subject to a terminal disclaimer.

(21) Appl. No.: 15/417,112

(22) Filed: Jan. 26, 2017

(65) Prior Publication Data
US 2017/0218887 A1    Aug. 3, 2017

(30) Foreign Application Priority Data

Jan. 28, 2016  (DE) .................. 10 2016 201 266
Jan. 28, 2016  (DE) .................. 10 2016 201 267

(51) Int. Cl.
*F02M 26/06*    (2016.01)
*F02M 26/70*    (2016.01)
(Continued)

(52) U.S. Cl.
CPC ............ *F02M 26/06* (2016.02); *F02M 26/17* (2016.02); *F02M 26/35* (2016.02); *F02M 26/64* (2016.02);
(Continued)

(58) Field of Classification Search
CPC ........ F02M 26/06; F02M 26/17; F02M 26/21; F02M 26/35; F02M 26/64; F02M 26/70; F02M 26/71; F02M 26/74
See application file for complete search history.

(56) References Cited

U.S. PATENT DOCUMENTS 2,950,567 A * 8/1960 Newman ............... A01G 27/006
                                                              47/17
3,200,833 A * 8/1965 McColl .................... F16K 49/00
                                                             137/154
(Continued)

FOREIGN PATENT DOCUMENTS

DE    202014100190 U1 *  2/2014  ............ F16K 11/052
DE    102012213998 B3     3/2014
(Continued)

*Primary Examiner* — Laert Dounis
(74) *Attorney, Agent, or Firm* — Geoffrey Brumbaugh; McCoy Russell LLP (57) ABSTRACT

An Exhaust Gas Recirculation (EGR) Valve is disclosed including a housing having a first side configured to be coupled with a fresh air inlet, a second side configured to be coupled with an outlet, and an exhaust-gas inlet defined at a bottom of the housing. The housing may include one or more inner surfaces defining at least one path to direct a condensate, when present at any point on a bottom surface of an inside of the housing, to a low point within the housing directed by gravity. The outlet may be configured to be fluidically coupled with a turbo compressor.

17 Claims, 5 Drawing Sheets

(51) Int. Cl.
    *F02M 26/17*     (2016.01)
    *F02M 26/35*     (2016.01)
    *F02M 26/64*     (2016.01)
    *F02M 26/74*     (2016.01)

(52) U.S. Cl.
    CPC ............ *F02M 26/70* (2016.02); *F02M 26/74* (2016.02); *Y02T 10/144* (2013.01)

(56) References Cited

U.S. PATENT DOCUMENTS

| | | | |
|---|---|---|---|
| 4,635,609 | A | 1/1987 | Seppen et al. |
| 9,670,882 | B2 * | 6/2017 | Kuske ................... F02M 26/71 |
| 2007/0031278 | A1 * | 2/2007 | Edwards ............. F01C 21/0836 |
| | | | 418/161 |
| 2011/0225959 | A1 * | 9/2011 | Sailer ..................... F02M 26/14 |
| | | | 60/309 |
| 2013/0025576 | A1 * | 1/2013 | Busato ................. F02D 41/0047 |
| | | | 123/568.11 |
| 2013/0219886 | A1 * | 8/2013 | Koch ..................... F02M 26/00 |
| | | | 60/605.2 |
| 2014/0158096 | A1 * | 6/2014 | Leone ................. F02B 29/0468 |
| | | | 123/563 |
| 2015/0075162 | A1 * | 3/2015 | Yoshioka ............... F02M 26/06 |
| | | | 60/605.2 |

FOREIGN PATENT DOCUMENTS

| | | | | |
|---|---|---|---|---|
| DE | 102014200698 | A1 | 7/2015 | |
| DE | 102014215558 | A1 | 2/2016 | |
| FR | 2925351 | A1 * | 6/2009 | .......... F02B 29/0462 |
| WO | 2012048784 | A1 | 4/2012 | |

* cited by examiner

LOW-PRESSURE EGR VALVE HAVING A CONDENSATE LINE

CROSS REFERENCE TO RELATED APPLICATION

The present application claims priority to German Patent Application No. 102016201267.3, filed on Jan. 28, 2016, and to German Patent Application No. 102016201266.5, filed on Jan. 28, 2016. The entire contents of the above-referenced applications are hereby incorporated by reference in their entirety for all purposes.

FIELD

The invention relates to a low-pressure EGR valve for a motor vehicle having an internal combustion engine, and to a motor vehicle having such a low-pressure EGR valve.

BACKGROUND\SUMMARY

Motor vehicle emissions are governed by legal limits whose purpose is to minimize the environmental effects of motor vehicle traffic. This relates in particular to the emission of fine dust such as soot particles, and of nitrous oxides. A widespread approach for minimizing the emission of nitrous oxides provides for mixing part of the exhaust gas, produced during combustion of the fuel in the internal combustion engine, to the combustion air for the internal combustion engine, in order to thus lower the combustion temperature and to carry out the combustion of the fuel without excess oxygen. This technique, known as exhaust-gas recirculation (EGR), can conventionally be performed at high or low pressure, that is to say upstream (high-pressure EGR) or downstream (low-pressure EGR) of an exhaust-gas turbine and/or exhaust-gas aftertreatment devices. It is also possible to provide combinations of high-pressure and low-pressure EGR.

For exhaust-gas recirculation, exhaust gas is taken from the exhaust-gas stream of the internal combustion engine by a branch line and is mixed with the fresh air by means of an EGR valve, thus producing the combustion air for the internal combustion engine. It is then commonly possible to use the EGR valve to influence the mixing ratio of fresh air to exhaust gas, in order to permit suitable mixing ratios for various driving states. For example, it can be provided to interrupt the recirculation of exhaust gas in the case of very high engine power, because in this case a large quantity of fuel is burned and as much oxygen as possible is to be supplied with the combustion air. It can however also be provided, in the case of low engine power, to admix a large fraction of exhaust gas in order to burn the fuel without excess oxygen.

The invention has the object of introducing an improved low-pressure EGR valve.

The invention introduces a low-pressure EGR valve that is equipped with a fresh air inlet, an exhaust-gas outlet and an outlet. According to the invention, an internal wall of a housing of the low-pressure EGR valve between the outlet and the fresh air inlet has, at a lowest point during proper use of the low-pressure EGR valve, a drain for condensate.

The outlet of the low-pressure EGR valve is designed to be connected to a compressor which compresses, for the internal combustion engine, the combustion air prepared from the fresh air and the recirculated exhaust gas in variable mixing ratios.

In particular at low ambient temperatures, the water vapor contained in the recirculated exhaust gas can condense as a consequence of the cooling on contact with the fresh air supplied in the low-pressure EGR valve through the fresh air inlet, or by contact with the cold wall of the low-pressure EGR valve. The condensed water collects in the low-pressure EGR valve and can even freeze in the event of prolonged residence in the low-pressure EGR valve. The compressor, connected to the outlet in proper use of the low-pressure EGR valve, contains a compressor wheel that rotates at very high speed and sucks in the recirculated exhaust gas and the fresh air. The invention is based on and incorporates the knowledge that the compressor wheel can be damaged if water droplets or even ice particles are sucked in and impact on the compressor wheel. The low-pressure EGR valve of the invention has the advantage that condensed water can flow out of the low-pressure EGR valve through the drain. The water can then for example be removed via the exhaust-gas path and released into the environment. In that context, the drain represents a path for the condensate which is open even if the exhaust-gas inlet were closed for the condensate, for example because no exhaust gas is to be recirculated due to the instantaneous operating state.

Proper use is to be understood here as meaning that the low-pressure EGR valve is installed in a motor vehicle and the motor vehicle is arranged on a flat road. Preferably, the connection face is formed such that, under these conditions, there is a gradient between the outlet and the exhaust-gas inlet, such that the condensate can flow away from the outlet and to the drain. Thus, in proper use, the outlet is above the drain.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE FIGURES

Figure 1:
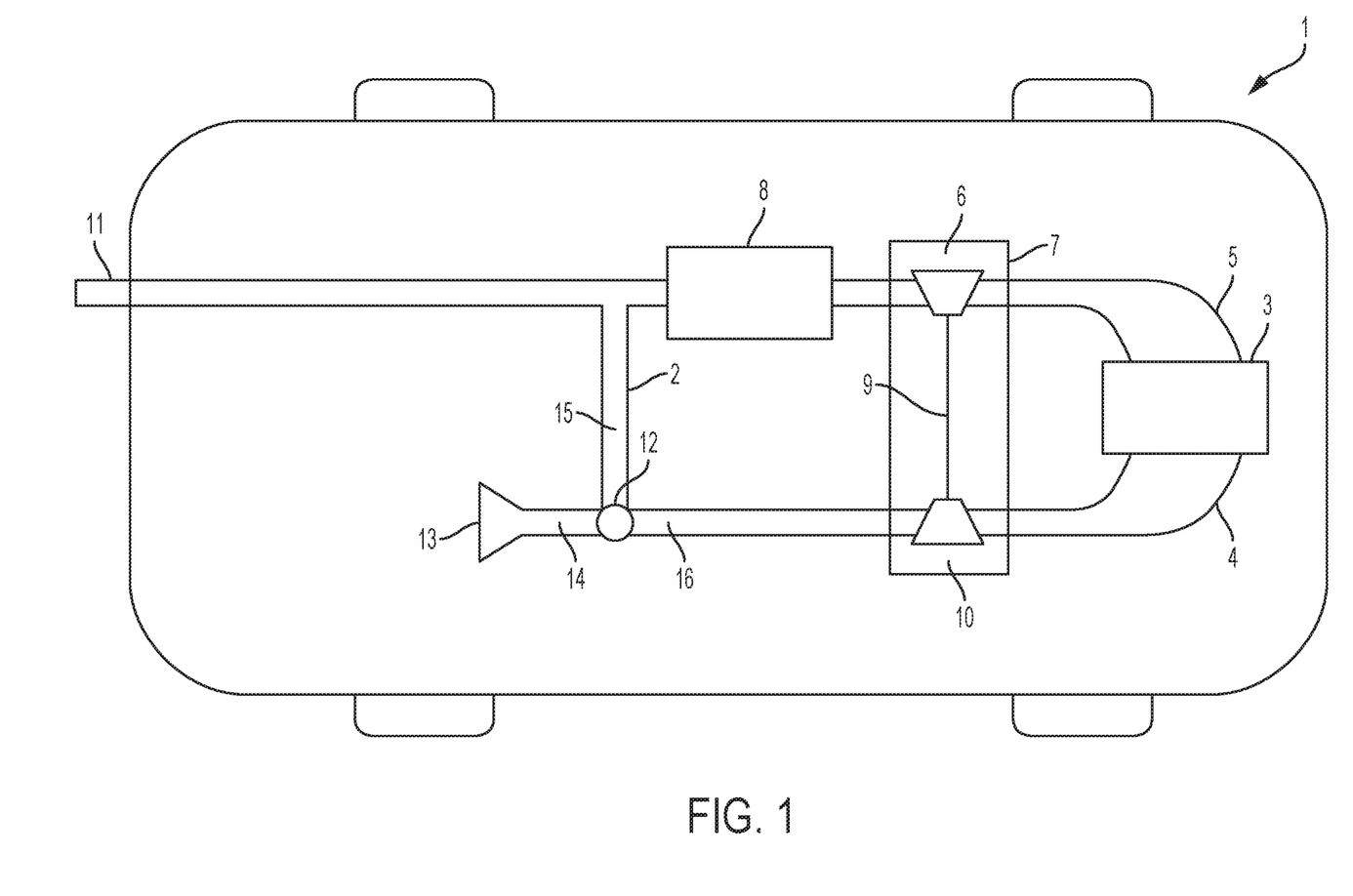
FIG. 1 schematically depicts an example vehicle system including low-pressure EGR.

FIG. 1 is a schematic diagram illustrating a motor vehicle 1 with a low-pressure exhaust-gas recirculation arrangement 2, in accordance with the present disclosure. The motor vehicle 1 may be equipped with an internal combustion engine 3 which may obtain the combustion air required for operation via an inlet air manifold 4, and may emit, via an exhaust-gas manifold 5, the exhaust gas produced during combustion. The exhaust gas may be expanded in an exhaust-gas turbine 6 of a turbocharger 7, before it may be guided through an exhaust-gas after-treatment device 8. However, it is also possible to envisage configurations in which the exhaust-gas turbine 6 or the exhaust-gas after-treatment device 8 is omitted. If a turbocharger 7 is provided, the exhaust-gas turbine 6 may be connected, via a shaft 9, to a compressor 10 which compresses the combustion air for the internal combustion engine. Other turbocharger and compressor configurations are possible within the context of the disclosure; it is, for example, possible to use an electrically operated compressor.

After passing through the exhaust-gas turbine 6 and/or the exhaust-gas after-treatment device 8, the exhaust gas may be expanded to a relatively low pressure. A low-pressure exhaust-gas recirculation arrangement 2, which can branch off downstream of the exhaust-gas turbine 6 or downstream of the exhaust-gas after-treatment device 8 (FIG. 1 shows, by way of example, a branching point downstream of the exhaust-gas after-treatment device 8), may supply a selectable fraction of the exhaust gas via a low-pressure EGR valve 12 to the inlet air side of the internal combustion engine 3 and more specifically the entrance to the compressor 10. The low-pressure EGR valve 12 may mix, in a selectable ratio, recirculated exhaust gas and fresh air aspirated via an air filter 13, and may supply the mixture as combustion air to the compressor 10 and thus to the internal combustion engine 3. That fraction of the exhaust gas which is not recirculated may be released to the environment via an exhaust tailpipe 11.

The combustion of the fuel may produce water vapor. Also, air humidity may be drawn in with the ambient air. When recirculated exhaust gas and fresh air are mixed in the low-pressure EGR valve, gas streams at very different temperatures meet, and water can condense. The resulting condensate may represent a danger to the integrity of the rapidly rotating compressor wheel of the compressor 10, and hence it may be desirable for it to be removed from the low-pressure EGR valve.

Figure 2:
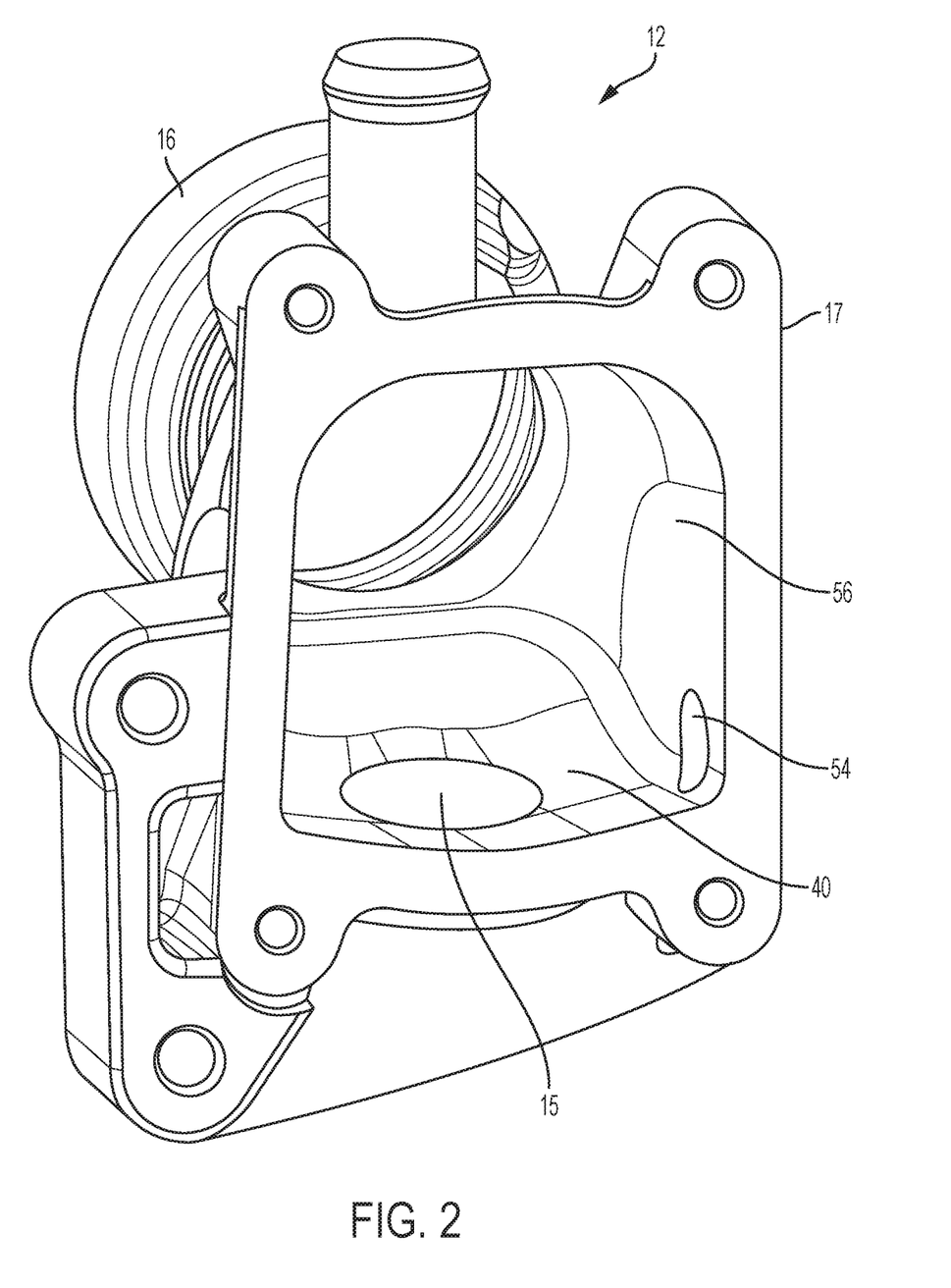
FIG. 2 shows a first illustrative embodiment of a low-pressure EGR valve according to the current application.

FIG. 2 is a sectional view illustrating a housing 17 of a first example embodiment of a low-pressure EGR valve 12 according to the current disclosure. The low-pressure EGR valve 12 may have a fresh air inlet 14 (not illustrated in this view), an exhaust-gas inlet 15 and an outlet 16. The low-pressure EGR valve 12 is illustrated as if looking in the direction of the fresh air inlet 14, such that the interior of the housing 17 is visible through this inlet. The large opening visible in FIG. 2 may typically be covered by an insert 19 which is omitted in the embodiment illustrated in FIG. 2, but can be seen in context in FIG. 3. A bottom surface 40, in which the exhaust-gas inlet 15 is arranged, is visible through the fresh air inlet 14 thus open. According to the disclosure, for any point on the bottom surface 40 there may be a path along the bottom surface 40 running monotonically down to a point on the rim of the exhaust-gas inlet 15. In this way, condensate droplets located on the bottom surface 40 may flow under gravity to the exhaust-gas inlet 15 and may ultimately flow away through the latter.

Figure 3:
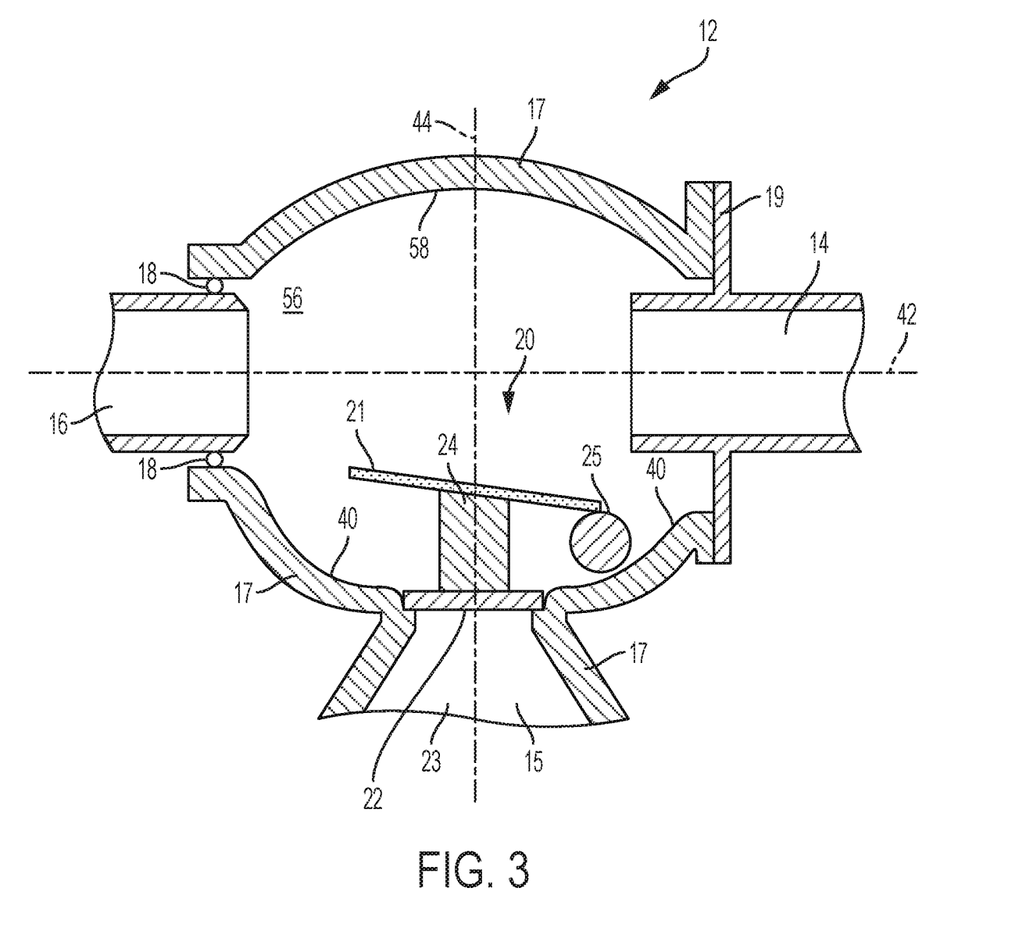
FIG. 3 shows a second illustrative embodiment of a low-pressure EGR valve according to the current application.

FIG. 2 also shows, in a wall 56 of the housing 17, a bearing 54 which can receive a shaft, or hinge 25 (see FIG. 3). The hinge 25 is designed to pivot a throttle flap of a throttle device 20, and thereby partially or fully close the fresh air inlet 14 and/or the exhaust-gas inlet 15.

FIG. 3 is a sectional view illustrating a second example embodiment of a low-pressure EGR valve 12 according to the present disclosure. In that context, the same reference signs denote similar or functionally similar parts, such that what has been stated for the first example embodiment also applies to the second example embodiment unless explicitly stated otherwise.

In the example embodiment shown in FIG. 3, the outlet 16 is created in a lateral cutout in the housing 17, where it is sealed in a gas-tight manner by a seal 18. The fresh air inlet 14 may be formed as part of an insert 19 which may form one wall of the internal space of the low-pressure EGR valve 12 and can be secured to the housing 17 for example by means of bolts or similar attachment means. This construction has the advantage that the insert 19 can be removed, whereby access can easily be gained to the internal space of the low-pressure EGR valve 12 during production or for maintenance or repair. The housing 17 and the insert 19 may be made of the same or different materials. For example, the housing 17 may be produced as a cast metal piece and the insert 19 may be made of synthetic material. However, many alternative construction variants are possible, such that the disclosure is not to be considered as being limited to the housing construction shown in any of the figures presented.

In the internal space of the low-pressure EGR valve 12, there is arranged a throttle device 20 for influencing a quantity of fresh air flowing in through the fresh air inlet 14 and a quantity of exhaust gas flowing in through the exhaust-gas inlet 15. In the example shown, the throttle device 20 comprises a first throttle flap 21 which is designed to influence the quantity of fresh air flowing in through the fresh air inlet 14. As shown in FIG. 3, the throttle device 20 may be in a position in which the fresh air inlet 14 is fully open. The quantity of exhaust gas flowing in through the exhaust-gas inlet 15 is influenced by a second throttle flap 22 which, in the exemplary embodiment shown in FIG. 3, closes, by way of example, an opening 23 of the exhaust-gas inlet 15 such that no exhaust gas can flow into the low-pressure EGR valve 12. Such a control state could, for example, prevail during operation at maximum engine power. The two throttle flaps 21 and 22 may be connected to one another by a connecting piece 24, although it is also conceivable to provide a single throttle flap which serves both to close the fresh air inlet 14 and to close the exhaust-gas inlet 15 in opposite positions of the throttle device 20. It may be possible to provide two throttle flaps 21 and 22 which can be pivoted independently of one another, such that the quantity of fresh air flowing in through the fresh air inlet 14 and the quantity of exhaust gas flowing in through the exhaust-gas inlet 15 can be influenced independently of one another. In the example embodiment shown, the throttle device 20 has a hinge 25 about which the throttle flaps 21 and 22 can be pivoted together by an actuator (not shown). The first throttle flap 21 of the throttle device 20 can be formed and arranged such that, when the fresh air inlet 14 is wide open, it shields as much as possible the region around the opening 23 of the exhaust-gas inlet 15 from a gas stream flowing from the fresh air inlet 14 to the outlet 16, such that condensate which has collected in the region around the opening 23 of the exhaust-gas inlet 15 is not carried with the gas stream into the outlet 16.

During, for example, predetermined use scenarios, the low-pressure EGR valve 12 may be oriented such that the exhaust-gas inlet 15 is arranged at the bottom and the fresh air inlet 14 and the outlet 16 are on opposite sides. According to the disclosure, the bottom surface 40 of the housing 17 may be shaped such that condensate located on the bottom surface flows to the exhaust-gas inlet 15. The condensate can be received by the exhaust-gas inlet 15 and thus discharged from the low-pressure EGR valve 12. In addition, in various embodiments, such as that shown in FIG. 3, of the low-pressure EGR valve 12, a ceiling 58 of the housing 17 may be shaped such that from any point on the ceiling 23 there may be a path along the ceiling 58 running monotonically down to the wall 56 (not shown in FIG. 3), such that condensate adhering to the ceiling 58 may be discharged to the wall 56 of the housing 17. The wall 56 may be usually shaped such that the condensate may flow down it to the bottom surface 40 of the housing 17. In this way, embodiments of the EGR valve 12 may guide condensate which precipitates at any point of the housing 17 in the direction of the exhaust-gas inlet 15, whence the condensate may be discharged from the low-pressure EGR valve 12.

In this way, the risk of damage to the compressor wheel of a compressor connected to the low-pressure EGR valve by liquid or frozen condensate may be reduced, in that the condensate may flow to the exhaust-gas inlet, and may be discharged via the latter from the low-pressure EGR valve.

Various embodiments may provide at least one path drops strictly monotonically. In this way condensate may be less likely to collect on any flat or horizontal part surface of the bottom surface. The bottom surface may have no part surfaces that are flat during specification-compliant use. It may additionally be provided that each point on the bottom surface has a certain minimum gradient, for example a gradient of at least 10 degrees.

In some embodiments, the exhaust-gas inlet of the low-pressure EGR valve 12 may be arranged at a lowest point of the bottom surface 40 during specification-compliant use, which may encourage that significantly all of the condensate flows out of the low-pressure EGR valve 12 into the exhaust-gas path.

The housing may further comprise a wall 56 which may be shaped such that, during specification-compliant use, from any point on the wall 56 there may be at least one path along the wall running monotonically down, for example, strictly monotonically down, to a given point of a rim of the bottom surface 40. This may promote that condensate forming on the wall 56 flows down the wall 56 to the bottom surface 40, where it may then be guided, as explained above, to the exhaust-gas inlet 15 and flows away via the latter.

The housing 17 may also include a ceiling 58 which may be shaped such that from any point on the ceiling there is at least one path along the ceiling 58 running monotonically down, for example, strictly monotonically down, to a given point of a rim of the wall 56. This may discourage condensate from adhering in droplets to the ceiling 58 of the housing 17, which may otherwise present the risk of such droplets spontaneously coming loose and being drawn via the outlet 16 into the compressor 10 (FIG. 1).

Various embodiments may provide a motor vehicle 1 having an internal combustion engine 3, an air filter 13, a compressor 10, a low-pressure exhaust-gas recirculation arrangement 2 and a low-pressure EGR valve 12, which may be connected to the air filter 13, the low-pressure exhaust-gas recirculation arrangement 2, and the compressor 10. The low-pressure exhaust-gas recirculation arrangement 2 may designed to discharge condensate from the low-pressure EGR valve 12 to an exhaust-gas inlet 15 of the motor vehicle 1.

Various embodiments may provide a low-pressure EGR valve 12, for use in a motor vehicle 1 that may have an internal combustion engine 3, in order to mix, in a selectable ratio, fresh air drawn in via an air filter 13 and exhaust-gas recirculation 2 from an exhaust-gas path to provide combustion air for the internal combustion engine 3.

Embodiments may provide one or more methods of using a low-pressure EGR valve 12 to manage potential condensate collection on surfaces inside the low-pressure EGR valve 12. Methods may include a step of opening the exhaust-gas inlet of the low-pressure EGR valve 12 in the course of a switch-off routine of the internal combustion engine 1. Thus, condensate, that has collected in the low-pressure EGR valve 12 and may not be able to flow away because the exhaust-gas inlet was temporarily closed or only slightly open depending on the operating state of the internal combustion engine, may be discharged prior to a pause in operation of the motor vehicle 1. For example, in the case of a relatively long pause in operation, it may thus be possible to minimize the danger of condensate freezing in the low-pressure EGR valve 12, and all the possible consequences such as immobilization of the throttle device or ice particles drawn into the compressor 10.

Methods in accordance with the present disclosure may also include opening the exhaust-gas inlet 15 of the low-pressure EGR valve 12 in the course of a switch-on routine of the internal combustion engine 3, in order, for example, to discharge condensate which may have formed and collected in the low-pressure EGR valve 12 only after the internal combustion engine 3 has been switched off.

Figure 4:
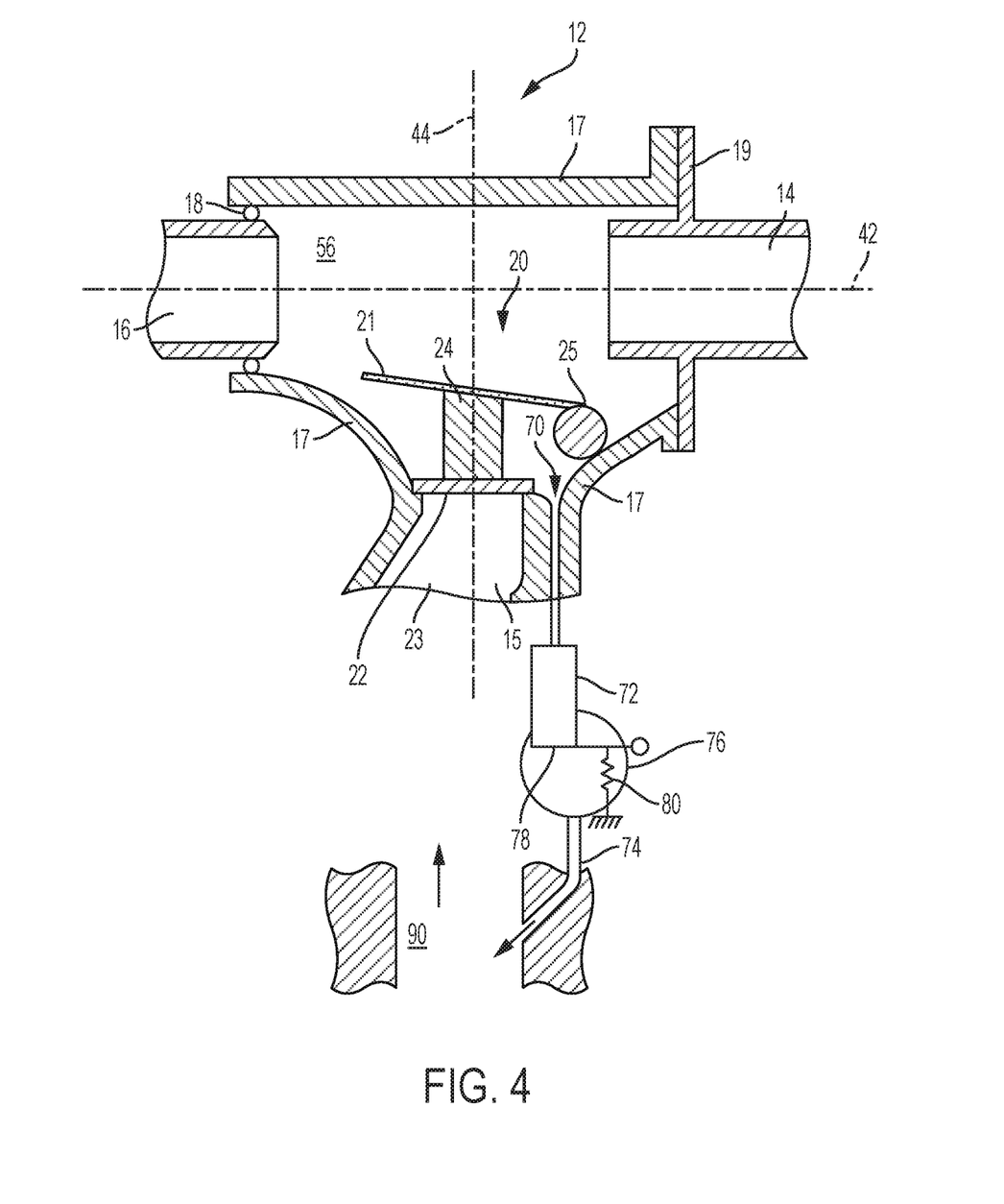
FIG. 4 shows a third illustrative embodiment of a low-pressure EGR valve according to the current application.

FIG. 4 is a cross sectional view illustrating another example embodiment of a low-pressure EGR valve 12 according to the present disclosure. The low-pressure EGR valve 12 may have a fresh air inlet 14, an exhaust-gas inlet 15, and an outlet 16. In the example shown, the low-pressure EGR valve 12 has a housing 17 into which the exhaust-gas inlet 15 opens. The outlet 16 may be set in a lateral cutout in the housing 17, where it may be sealed in a gas-tight manner by a seal 18. The fresh air inlet 14 may be formed as part of an insert 19 which may be formed on one wall of the internal space of the low-pressure EGR valve 12 and may be secured to the housing 17 by, for example, means of bolts or similar attachment means. This construction may have the advantage that the insert 19 may be removed, whereby access can easily be gained to the internal space of the low-pressure EGR valve 12 during production or for maintenance or repair. The housing 17 and the insert 19 may be made of the same, or different, materials. For example, the housing 17 may be produced as a cast metal piece and the insert 19 may be made of synthetic material. However, many alternative construction variants are possible, such that the invention is not to be considered as being limited to the housing construction shown in FIGS. 4 and 5.

In the internal space of the low-pressure EGR valve 12, there may be arranged a throttle device 20 for influencing a quantity of fresh air flowing in through the fresh air inlet 14 and a quantity of exhaust gas flowing in through the exhaust-gas inlet 15. In the example shown, the throttle device 20 may comprise a first throttle flap 21 which may be designed to influence the quantity of fresh air flowing in through the fresh air inlet 14. In FIG. 4, the throttle device 20 is shown in a position in which the fresh air inlet 14 is fully open and the exhaust-gas inlet 15 is closed. The quantity of exhaust gas flowing in through the exhaust-gas inlet 15 may be influenced by a second throttle flap 22 which, in the illustrated example embodiments, closes, by way of example, an opening 23 of the exhaust-gas inlet 15 such that no exhaust gas can flow into the low-pressure EGR valve. The two throttle flaps 21 and 22 may be connected to one another by a connecting piece 24, although it is also conceivable to provide a single throttle flap which serves both to close the fresh air inlet 14 and to close the exhaust-gas inlet 15 in opposite positions of the throttle device 20. It may also be possible to provide two throttle flaps 21 and 22 which can be pivoted independently of one another, such that the quantity of fresh air flowing in through the fresh air inlet 14 and the quantity of exhaust gas flowing in through the exhaust-gas inlet 15 can be influenced independently of one another. In the example embodiment shown, the throttle device 20 may have a hinge 25 about which the throttle flaps 21 and 22 can be pivoted by an actuator (not shown). The first throttle flap 21 of the throttle device 20 may be formed and arranged such that, when the fresh air inlet 14 is wide open, it may shield as much as possible the region around the opening 23 of the exhaust-gas inlet 15 from a gas stream flowing from the fresh air inlet 14 to the outlet 16. In this way, condensate which may have collected or frozen in the region around the opening 23 of the exhaust-gas inlet 15 may not carried with the gas stream into the outlet 16.

During what may be typical use, the low-pressure EGR valve 12 may be oriented such that the exhaust-gas inlet 15 is arranged at the bottom and the fresh air inlet 14 and the outlet 16 are on opposite sides.

According to various embodiments, an internal wall of the housing 17 of the low-pressure EGR valve 12 between the outlet 16 and the fresh air inlet 14 may have, at a lowest point during expected use, a drain 70 for condensate. The condensate can be received by the drain 70 and thus discharged from the low-pressure EGR valve 12.

In the example shown, the drain 70 may be connected to a condensate collection container 72 (not shown to scale) which can receive a relatively large quantity of condensate. Considerable latitude may be allowed for determining the dimensions of the condensate collection container 72. The size of the condensate collection container 72 may be determined to relate the maximum quantity of condensate that may be produced in a certain timespan to the desired shortest timespan in which the condensate collection container 72 can fill with condensate.

Figure 5:
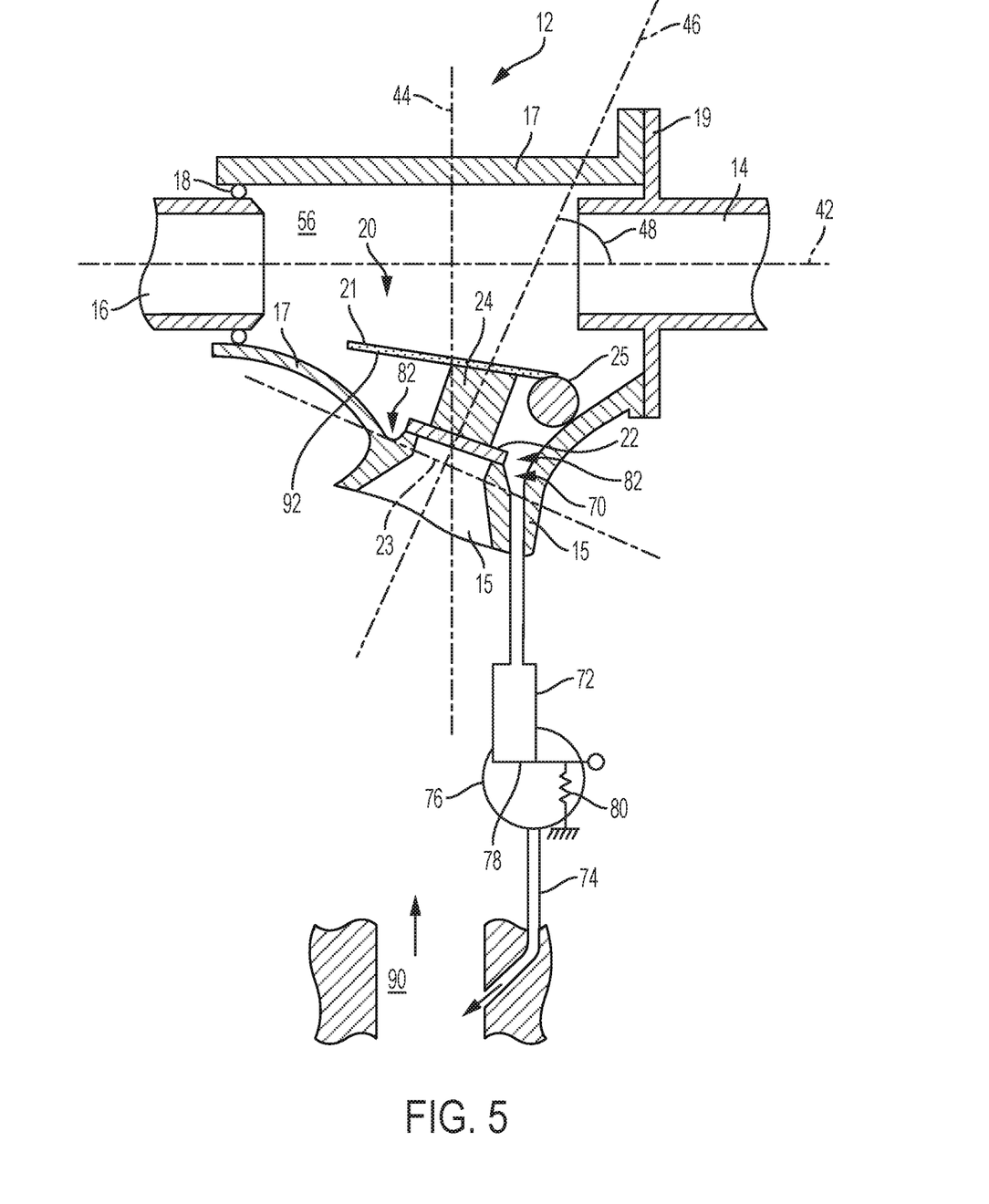
FIG. 5 shows a fourth illustrative embodiment of a low-pressure EGR valve according to the current application.

In some examples, the condensate collection container 72 may be emptied into the exhaust-gas path 90 or into the environment, to which end it can be equipped, as shown in FIGS. 4 and 5, with an exit 74. In this context, preference may be given to discharge into the exhaust-gas path 90, where the hot exhaust gas can re-vaporize the condensate and ultimately carry it away via the exhaust tailpipe into the environment. In order to empty the condensate collection container 72, the exit 74 may open automatically or when triggered by a control unit (not shown) of the motor vehicle 1. It is also conceivable to equip the condensate collection container 72 with a device for measuring the fill level.

Controlled opening of the exit 74 may advantageously be connected to predetermined conditions to effect preferred exhaust-gas after-treatment. For example, emptying of the condensate collection container 72 might be prevented in phases in which the exhaust-gas temperature should be high or be raised. Such phases may be, for example, the heating up of a condenser substrate to its light-off temperature, or the regeneration of a particle filter or of a lean NOx trap. Were the condensate collection container 72 to be emptied into the exhaust-gas path during such phases, the exhaust gas would have to supply vaporization heat in order to vaporize and remove the condensate. However, this may cause undesired cooling of the exhaust gas, so as to reduce or prevent the desired effect.

The exit 74 of the condensate collection container 72 may also be provided with a reed valve 76 which may open automatically when the collected condensate exceeds a certain fill level. The reed valve 76 may for example have a closure flap 78 and a spring element 80.

FIG. 5 shows another example embodiment of a low-pressure EGR valve 12 according to the disclosure. In that context, the same reference signs denote similar or functionally similar parts, such that what has been stated for the example embodiment illustrated in FIG. 4 may also apply to the example embodiment illustrated in FIG. 5 unless explicitly stated otherwise. The essential differentiating feature of the embodiment shown in FIG. 5 may be that the exhaust-gas inlet 15 may be arranged in the low-pressure EGR valve 12 such that the opening 23 of the exhaust-gas inlet 15 is oriented away from the outlet 16 and toward the fresh air inlet 14. The result of this is that the condensate produced flows to that side of the exhaust-gas inlet 15 that is oriented away from the outlet 16, and thus to a point located further away from the outlet 16. In this way, it may be less likely for the condensate to be drawn into the outlet 16, where it could damage the compressor 10. FIG. 5 also shows an optional depression 82, which is for example provided in annular fashion in the wall of the housing 17 around the opening 23 of the exhaust-gas inlet 15, wherein the depression 82 may run in a plane normal to a central axis 46 of the exhaust-gas inlet 15. However, other configurations for such a depression 82 are possible according to the conditions of the respective individual case. Due to the orientation of the exhaust-gas inlet 15 away from the outlet 16, the central axis 46 of the exhaust-gas inlet 15 may form an acute angle 48 with the abscissa, or horizontal axis 42, perpendicular to a vertical axis 44, which, in proper use of the low-pressure EGR valve 12, should be arranged horizontally. The depression 82 of the embodiment shown may have the advantage that condensate, reaching the depression 82 on that side of the opening 23 oriented toward the outlet 16, is guided around the opening 23 to that side of the opening 23 of the exhaust-gas inlet 15 oriented away from the outlet 16, and thus to the drain 70 arranged there.

In this way, the risk of damage to the compressor wheel of a compressor 10 connected to the low-pressure EGR valve 12 by liquid or frozen condensate may be reduced, in that the condensate may be guided away from the outlet 16 of the low-pressure EGR valve 12, to which the compressor 10 is connected, and may be discharged via the drain 70.

Embodiments may provide low-pressure Exhaust Gas Recirculation (EGR) Valve 12 including a housing 17. The housing 17 may have a first side configured to be coupled with a fresh air inlet 14, a second side configured to be coupled with an outlet 16, and an exhaust-gas inlet 15 defined at a bottom of the housing. The housing 17 may also include one or more inner surfaces defining at least one path to direct a condensate, when present at any point on a bottom surface 40 of an inside of the housing 17, to a low point within the housing 17 directed by gravity. In addition, the outlet 16 may be configured to be fluidically coupled with a turbo compressor 10.

Embodiments may provide a wall 56 between the outlet 16 and the drain 70 and/or between the fresh air inlet 14 and the drain 70 can have a curve profile that drops monotonically to the drain 70. The effect of the monotonically dropping curve profile of the wall 56 is that the condensate may flow to the drain 70 and may not retained on the way at depressions or the like.

Preferably, the drain 70 of the low-pressure EGR valve 12 may be connected to a condensate collection container 72 which may be designed to receive the condensate via the drain 70. The condensate can be collected in the condensate collection container 72 remote from the low-pressure EGR valve outlet 16 connected to the compressor wheel of the compressor 10 (FIG. 1), such that no condensate may remain in the vicinity of the outlet 16, which could be sucked into the compressor wheel 10.

The condensate collection container 72 may have an exit 74 which may be or can be connected to an exhaust-gas path 90 and may be designed to discharge, to the exhaust-gas path 90, a quantity of condensate located in the condensate collection container 72. The condensate discharged to the exhaust-gas path 90 can be once again evaporated by the hot exhaust gases flowing through the exhaust-gas path 90 during operation of the internal combustion engine 3, and can be released into the environment together with the exhaust gases.

The exit 74 of the condensate collection container 72 may have a reed valve 76 which may be designed to open the exit 74 when a pressure difference between an internal pressure in the condensate collection container 72 and an external pressure downstream of the exit 74 exceeds a first predetermined value, and to discharge the quantity of condensate into the exhaust-gas path 90. In addition, the reed valve 76 may be designed to re-close the exit 74 when the pressure difference between the internal pressure and the external pressure falls below a second predetermined value. In that context, the first pressure difference may be identical or different to the second pressure difference. Preferably, the first pressure difference may be greater than the second pressure difference. The fact that the reed valve 76 closes the exit 74 of the condensate collection container and opens at a certain pressure difference may make it possible for condensate to be collected over a certain operating period, the precise length of which may depend on the environmental conditions and the operating parameters. In this way, the compressor 10 connected to the low-pressure EGR valve 12 may not draw in any secondary air which may not be accounted for in the mass throughflow calculations. For example, additional exhaust gas flowing in from the exhaust-gas path via the exit of the condensate collection container 72, may change, in an uncontrolled manner, the conditions for combustion of the fuel in the internal combustion engine. Preferably, the exit 74 of the condensate collection container 72 opens into the exhaust-gas path downstream of a low-pressure exhaust-gas recirculation line 2, such that the condensate discharged from the condensate collection container 72 cannot return to the low-pressure EGR valve 12 with the recirculated exhaust gas.

It is also conceivable to provide the condensate collection container 72 with a fill level measurement device and/or a controllable closure. It is for example possible in this context for the closure flap 78 to be actuated by a control unit when a certain fill level is reached, or in the event of a certain cue such as the internal combustion engine being switched off, and thus opened such that the collected condensate is released into the exhaust-gas path 90 or directly into the environment.

When using an automatic reed valve, the first predefinable pressure difference may correspond to a predetermined maximum fill level of the condensate collection container 72. Due to the suction of the compressor 10, the pressure within the low-pressure EGR valve may be generally lower than the pressure in the immediate vicinity upstream of the low-pressure EGR valve 12, and this may allow the reed valve 76 to close automatically. However, if a certain quantity of condensate has collected in the condensate collection container, the weight of this condensate may act on the reed valve 76, opening it when the predefinable maximum fill level is reached, due to the pressure difference (actually, force difference) brought about in this context.

For example, the reed valve 76 may have a closure flap 78 and a spring element 80 connected to the closure flap 78, which spring element 80 may be designed to exert a return force on the closure flap 78. On the basis of the diameter or the cross-sectional area of the condensate collection container 72, the surface of the closure flap 78 on which the weight of the condensate in the condensate collection container 72 acts, and the magnitude of the return force, it is possible to predefine the maximum fill level and, indirectly, the time interval between two emptying procedures of the condensate collection container 72.

Preferably, the low-pressure EGR valve 12 may have at least one throttle device 20 for influencing a quantity of fresh air flowing in through the fresh air inlet 14 and a quantity of exhaust gas flowing in through the exhaust-gas inlet. The throttle device 20 may be designed to close the exhaust-gas inlet 15 when in a closed position. The throttle device 20 may also have a shield 92 that is designed, in the closed position, to at least partially shield a surrounding region, arranged around the exhaust-gas outlet, from a gas stream from the fresh air inlet to the outlet. The shield 92 may be included with, coupled with, or be a portion of the second trotle flap 21. The greatest quantity of fresh air flows into the low-pressure EGR valve in the closed position (and positions of the throttle device in which the exhaust-gas inlet may be only slightly open), and hence the danger of condensate formation or ice formation in the low-pressure EGR valve is greatest. If condensate has already formed, it may have run off in the direction of the drain, where it may be shielded by the shield 92 from the gas stream flowing entirely or primarily from the fresh air inlet to the outlet, such that there may be little risk of droplets or ice particles from the thus shielded condensate being sucked into the compressor 10 that may be connected, via the outlet 16, to the low-pressure EGR valve 12.

The shield 92 may be a throttle flap 21 which may be furthermore designed to influence the quantity of fresh air flowing in through the fresh air inlet 14. The throttle flap 21 can for example be pivoted about a shaft 25 arranged between the exhaust-gas inlet and the fresh air inlet 14, such that, when the fresh air inlet 14 is opened, the throttle flap may cover, to an ever greater extent, the exhaust-gas inlet and the drain, and shields these. This arrangement of the shaft 25 may provide an additional advantage in that, due to the smaller lever length, the exhaust-gas inlet may be opened with the application of a smaller force in the event of frozen condensate than if the condensate were frozen solid entirely or partially on the opposite side of the exhaust-gas inlet as seen from the shaft, that is to say that side facing the outlet 14.

Preferably, the low-pressure EGR valve of the disclosure may be termed a combination valve, in which use can be made of just one actuator to simultaneously open the fresh air inlet 14 and close the exhaust-gas inlet 15, or to close the fresh air inlet 14 and open the exhaust-gas inlet 15. It is however also possible to equip both the exhaust-gas inlet 15 and the fresh air inlet 14 of the low-pressure EGR valve with a respective throttle flap, which can each be pivoted about their own shaft and can be moved by means of their own actuator. Such an arrangement may be more complex than a combination valve, but may offer greater freedom in terms of determining the mixing ratio of fresh air to recirculated exhaust gas.

Embodiments may provide a motor vehicle 1 comprising a low-pressure EGR valve 12. The low-pressure EGR valve 12 may have a fresh air inlet 2 coupled to the EGR valve 12 at a first side, an outlet 16 coupled to the EGR valve at a second side, and an exhaust gas inlet 15 defined at a bottom of the EGR valve for fluidically coupling with an EGR passage 2. The EGR valve 12 may also include a throttle mechanism 20 located inside the EGR valve 12 and configured to control relative amounts of: inflow of fresh air via the fresh air inlet 14 into a housing cavity in the EGR valve 12, and inflow of exhaust via the exhaust gas inlet 15 into the housing cavity. There may be surfaces defining the housing cavity such that from any point on the bottom surface 40 of the cavity there is at least one path running monotonically downward and into the EGR passage 2.

In some example embodiments, there may be at least one path that crosses the exhaust gas inlet 15 such that a condensate can enter into the EGR passage 2 when a second throttle flap 22 pivots away from the exhaust gas inlet 15. Some example embodiments, may include a first throttle flap 21 in spaced relation with the second throttle flap 22 serves to protect a condensate collected adjacent the exhaust gas inlet 15 from being entrained in the inflow of fresh air via the fresh air inlet 14 while the second throttle flap 22 is in a closed position over the exhaust gas inlet 15.

In other example embodiments, there may be a motor vehicle 1 wherein the at least one path passes through a drain 70 and into a condensate collection container 72 such that a condensate can enter into the EGR passage 2 when a closure flap 78 at a bottom of the condensate collection container 72 opens to allow fluidic coupling of the condensate collection container 72 with the EGR passage 2 via an exit 74.

Embodiments may provide a low-pressure Exhaust Gas Recirculation (EGR) valve 12 including a first coupling mechanism for a fresh air inlet 14, a second coupling mechanism for an outlet 16, and a third coupling mechanism at a bottom of the EGR valve 12 for an exhaust gas inlet 15 leading from an EGR line 2. A valve housing 17 may define an internal wall 56, a ceiling 88, and a bottom surface 40, at least one path to the exhaust gas inlet 15 from any point on one or more of the wall 56, the ceiling 58, and the bottom surface 40, running monotonically down to the EGR line 2.

Although the current application has been illustrated and described more specifically in detail by means of illustrative embodiments of example embodiments, the current application is not restricted by the examples disclosed. Variants of the current application can be derived by a person skilled in the art from the illustrative embodiments shown without exceeding the scope of protection of the current application as defined in the claims.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or a "first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A low-pressure exhaust gas recirculation (EGR) valve comprising:
   a housing having:
      a first side configured to be coupled with a fresh air inlet;
      a second side configured to be coupled with an outlet;
      an exhaust-gas inlet defined at a bottom of the housing;
      one or more inner surfaces defining at least one path to direct a condensate, when present at any point on a bottom surface of an inside of the housing, to a low point within the housing directed by gravity, wherein the at least one path drops monotonically;
      a condensate drain arranged at the bottom of the housing adjacent to the exhaust-gas inlet and closer to the first side than the second side, and where the condensate drain directs the condensate to a condensate collection container arranged outside of the housing, and the condensate collection container having an exit connectable to an exhaust-gas path and designed to discharge, to the exhaust-gas path, a quantity of condensate located in the condensate collection container to a portion of the exhaust-gas path upstream of the exhaust-gas inlet;
   the outlet configured to be fluidically coupled with a turbo compressor; and
   instructions stored in non-transitory memory for controlling opening of the exit responsive to predetermined conditions, including selectively releasing condensate to the portion of the exhaust-gas path upstream of the exhaust-gas inlet when it is not determined to raise an exhaust-gas temperature, and not release condensate when it is determined to raise the exhaust-gas temperature.

2. The low-pressure EGR valve of claim 1, wherein the exhaust-gas inlet is arranged at a lowest point of the bottom surface.

3. The low-pressure EGR valve of claim 1, in which the housing includes a wall shaped such that from any point on the wall there is at least one path along the wall running monotonically down to a given point on a rim of the bottom surface.

4. The low-pressure EGR valve of claim 1, in which the housing includes a ceiling which is shaped such that from any point on the ceiling there is at least one path along the ceiling running monotonically down to a given point on a rim of a wall.

5. The low-pressure EGR valve of claim 1, wherein a wall between the outlet and the condensate drain and/or between the fresh air inlet and the condensate drain has a curved profile that drops monotonically to the condensate drain.

6. The low-pressure EGR valve of claim 1, wherein the raising of the exhaust-gas temperature is determined for heating up of a substrate to its light-off temperature, or a regeneration of a particle filter or of a lean NOx trap.

7. The low-pressure EGR valve of claim 6, wherein the exit of the condensate collection container has a reed valve which is designed to open the exit when a pressure difference between an internal pressure in the condensate collection container and an external pressure downstream of the exit exceeds a first predetermined value, and to discharge the quantity of condensate into the exhaust-gas path, and to re-close the exit when the pressure difference between the internal pressure and the external pressure falls below a second predetermined value.

8. The low-pressure EGR valve of claim 7, wherein the first predetermined value corresponds to a predetermined maximum fill level of the condensate collection container.

9. The low-pressure EGR valve of claim 7, wherein the reed valve has a closure flap and a spring element connected to the closure flap, wherein the spring element is designed to exert a return force on the closure flap.

10. The low-pressure EGR valve of claim 1, further comprising at least one throttle device for influencing a quantity of fresh air flowing in through the fresh air inlet and a quantity of exhaust gas flowing in through the exhaust-gas inlet.

11. The low-pressure EGR valve of claim 10, wherein the throttle device is designed to close the exhaust-gas inlet when in a closed position, and in which the throttle device has a shield that is designed, in the closed position, to at least partially shield a surrounding region, arranged around the exhaust-gas inlet, from a gas stream from the fresh air inlet to the outlet.

12. The low-pressure EGR valve of claim 11, wherein the shield is a throttle flap which is furthermore designed to influence the quantity of fresh air flowing in through the fresh air inlet.

13. A low-pressure exhaust gas recirculation (EGR) valve comprising:
a fresh air inlet at a first side of the EGR valve;
an outlet at a second side of the EGR valve, opposite the first side of the EGR valve;
an exhaust gas inlet at a bottom of the EGR valve, between the first and second sides of the EGR valve, leading from an EGR line;
a drain at the bottom of the EGR valve adjacent to the exhaust gas inlet and closer to the first side of the EGR valve than the second side of the EGR valve, wherein the drain is fluidly coupled to a condensate collection container configured to release condensate to a portion of an exhaust-gas path upstream of the exhaust gas inlet; and
a valve housing defining an internal wall, a ceiling, and a bottom surface, at least one path to the exhaust gas inlet from any point on one or more of the wall, the ceiling, and the bottom surface running monotonically down to the EGR line; and
instructions stored in non-transitory memory for controlling opening of an exit of the condensate collection container responsive to predetermined conditions, including selectively releasing condensate to the portion of the exhaust-gas path upstream of the exhaust-gas inlet when it is not determined to regenerate a particulate filter or a lean NOx trap.

14. The low-pressure EGR valve of claim 13, wherein the at least one path is via a rim of the exhaust gas inlet.

15. A motor vehicle comprising:
a low-pressure EGR valve having:
a fresh air inlet coupled to the EGR valve at a first side,
an outlet coupled to the EGR valve at a second side, and
an exhaust gas inlet defined at a bottom of the EGR valve for fluidically coupling with an EGR passage;
a drain at the bottom of the EGR valve adjacent to the exhaust gas inlet and biased to the first side, further comprising a depression extending from the drain completely around the exhaust gas inlet, wherein the drain is fluidly coupled to a condensate collection container configured to release condensate to a portion of an exhaust-gas path upstream of the exhaust gas inlet outside of a regeneration of a particulate filter or a regeneration of a lean $NO_x$ trap; and
a throttle mechanism located inside the EGR valve and configured to control relative amounts of: inflow of fresh air via the exhaust gas inlet into a housing cavity in the EGR valve, and inflow of exhaust via the exhaust gas inlet into the housing cavity; and
surfaces defining the housing cavity such that from any point on a bottom surface of the housing cavity there is at least one path running monotonically downward and into the EGR passage; and
instructions stored in non-transitory memory for controlling opening of an exit of the condensate collection container responsive to predetermined conditions, including selectively releasing condensate to the portion of the exhaust-gas path upstream of the exhaust gas inlet when it is not determined to raise an exhaust-gas temperature, and not releasing condensate when it is determined to raise the exhaust-gas temperature.

16. The motor vehicle of claim 15, further comprising a reed valve arranged between the condensate collection container and the exit, the exit fluidly coupled to the portion of the exhaust-gas path upstream of the exhaust gas inlet, and where the reed valve adjusts a flow of condensate to the exit.

17. The motor vehicle of claim 16, wherein the reed valve adjusts the flow of condensate in response to a pressure or an electric signal from a controller.

* * * * *